(12) United States Patent
Dance

(10) Patent No.: US 8,380,653 B2
(45) Date of Patent: Feb. 19, 2013

(54) SOLVING CONTINUOUS STOCHASTIC JUMP CONTROL PROBLEMS WITH APPROXIMATE LINEAR PROGRAMMING

(75) Inventor: Christopher R Dance, Grenoble (FR)

(73) Assignee: Xerox Corporation, Norwalk, CT (US)

( * ) Notice: Subject to any disclaimer, the term of this patent is extended or adjusted under 35 U.S.C. 154(b) by 575 days.

(21) Appl. No.: 12/689,508

(22) Filed: Jan. 19, 2010

(65) Prior Publication Data

US 2011/0178975 A1     Jul. 21, 2011

(51) Int. Cl.
*G06F 7/60* (2006.01)
*G06F 9/44* (2006.01)

(52) U.S. Cl. .............................. 706/52; 703/2
(58) Field of Classification Search .................. None
See application file for complete search history.

(56) References Cited

U.S. PATENT DOCUMENTS 5,526,021 A * 6/1996 Naylor, Jr. .................. 715/804
6,490,572 B2 * 12/2002 Akkiraju et al. ............. 706/19

OTHER PUBLICATIONS

D. de Farias & B. Van Roy. Approximate Dynamic Programming Via Linear Programming. In *NIPS*, pp. 689-695. 2001.
D. de Farias & B. Van Roy. Approximate Linear Programming for Average-Cost Dynamic Programming, in *NIPS*, 2002.
D. de Farias & B. Van Roy. The Linear Programming Approach to Approximate Dynamic Programming, *Oper. Res.*, 51(6):850-865, 2003.
D. de Farias & B. Van Roy. A Cost-Shaping LP for Bellman Error Minimization with Performance Guarantees, in *NIPS*, 2004.
D. de Farias & B. Van Roy. On Constraint Sampling in the Linear Programming Approach to Approximate Dynamic Programming, *Math. Oper. Res.*, 39(3);: 462-478, 2004.
D. de Farias & B. Van Roy. A Cost-Shaping Linear Program for Average-Cost Approximate Dynamic Programming with Performance Guarantees. *Math. Oper. Res.*, 31(3);: 597-620, 2006.
D. de Farias & B. Van Roy. An Approximate Dynamic Programming Approach to Network Revenue Management. Submitted for Publication, 2008, Technical Report, Stanford University.
D. de Farias & B. Van Roy. Tetris: A Study of Randomized Constraint Sampling. Springer-Verlag, 2006.
J. Han & B. Van Roy. Control of Diffusions Via Linear Programming. 2008.
M. Hauskrecht & V. Kveton. Linear Program Approximations for Factored Continuous-State Markov Decision Processes. In *NIPS*, 2004.
P. Schweitzer & A. Seidmann. Gneralized Polynomial Approximations in Markovian Decision Processes. *J. Math. Anal. and App.*, 110:568-582, 1985.
M. Trick & S. Zin. Spline Approximations to Value Functions: A Linear Programming Approach. *Macroeconomic Dynamics*, 1, 1997.
J. Tsitsiklis & V. Van Roy. Regression Methods for Pricing Complex American-Style Options. *IEEE Trans. Neural Networks*, 12(4), 2001.

* cited by examiner

Primary Examiner — Alan Chen
(74) Attorney, Agent, or Firm — Fay Sharpe LLP

(57) ABSTRACT

In a scheduling or planning process, a hybrid process is determined representing operation of a system. The hybrid process includes stochastic jumps. An approximate linear program is constructed respective to the hybrid process and a set of control actions for controlling the system. The approximate linear program includes a stochastic jump constraint term representative of stochastic jumps of the hybrid process. The approximate linear program is solved. The system is controlled based on the solved approximate linear program.

22 Claims, 2 Drawing Sheets

SOLVING CONTINUOUS STOCHASTIC JUMP CONTROL PROBLEMS WITH APPROXIMATE LINEAR PROGRAMMING

BACKGROUND

The following relates to the planning arts, predictive arts, scheduling arts, and related arts, and will find application in diverse fields such as for example equipment servicing, delivery services, robotic control, financial planning, and other fields entailing hybrid processes that are generally continuous but include occasional discrete events or discontinuities.

Stochastic control problems are relevant to numerous applications entailing modeling or other representation of a process that evolves over time (or with respect to another variable). In the 1960's various exact linear programming solution techniques were developed for such problems. These linear programming methods entail determining a value function indicative of the cost on the process of taking an action, constructing a constraint on the solution in the form of a linear combination, and optimizing the value function subject to the constraint. These exact linear programming solution techniques are computationally intensive and impractical for large state spaces, a problem sometimes referred to as the "curse of dimensionality."

In the 1980's, techniques were developed to obtain linear programming solutions in an approximate manner. These techniques entail representing the value function as a linear combination of basis functions and optimizing the weights or coefficients of the linear combination of basis functions subject to the constraints also represented in terms of the linear combination of basis functions. In effect, the dimensionality is reduced from the number of states in the state space to the number of weights in the lower dimensional weight space. This variation of linear programming is known in the art as approximate linear programming (ALP).

ALP substantially enhances the applicability of linear programming to practical problems. However, ALP, and linear programming in general, has heretofore been applied to continuous processes (possibly represented by discrete time samples) in which the variation with respect to time (or another variable) is continuous and does not include jumps or abrupt transitions.

Adaptation of linear programming to planning, scheduling or to generally continuous processes with occasional discontinuities or abrupt changes would substantially increase the range of target planning and scheduling applications. For example, machine maintenance scheduling involves abrupt discontinuities respective to time generated by machines transitioning between states (e.g., from a working state to a failure state to an "under repair" state back to a working state). Some stock market modeling applications would also benefit from the ability to model rapid stock price transitions caused by discrete events (e.g., corporate announcements, major political events, or so forth) as abrupt jumps or transitions. Such processes which are generally continuous but include occasional jumps, discontinuities, or abrupt changes are sometimes called "hybrid" processes.

Heretofore, linear programming techniques have generally not been used in conjunction with hybrid processes having jumps or discontinuities. Conceptually, existing linear programming techniques involve searching a constrained continuous space to identify a vertex or other extremum corresponding to a constrained optimum value of the value function. It is not readily apparent that such linear programming techniques could be adapted to handle hybrid processes in which the value function has discontinuities within the searched space.

BRIEF DESCRIPTION

In some illustrative embodiments disclosed as illustrative examples herein, a scheduling or planning process is disclosed, comprising: constructing an approximate linear program including (i) a value function defined by a linear combination of basis functions, the value function representing action costs respective to a hybrid process including stochastic jumps and (ii) a linear constraint including a stochastic jump constraint term representative of stochastic jumps in the hybrid process; solving the approximate linear program; and selecting an action to be performed based on parameters provided by the solved approximate linear program.

In some illustrative embodiments disclosed as illustrative examples herein, a digital storage medium is disclosed storing instructions executable to perform a scheduling or planning process as set forth in the immediately preceding paragraph.

In some illustrative embodiments disclosed as illustrative examples herein, a scheduler or planner is disclosed, comprising: a value function constructor configured to construct a value function defined by a linear combination of basis functions, the value function representing action costs respective to a hybrid process including stochastic jumps; a constraints constructor configured to construct a linear constraint including a stochastic jump constraint term representative of stochastic jumps in the hybrid process; an approximate linear program solving engine configured to solve an approximate linear program defined by the value function and the linear constraint; and an action selector configured to select an action to be performed based on parameters of the solved approximate linear program.

In some illustrative embodiments disclosed as illustrative examples herein, a scheduling or planning process is disclosed, comprising: determining a hybrid process representing operation of a system, the hybrid process including stochastic jumps; constructing an approximate linear program respective to the hybrid process and a set of control actions for controlling the system, the approximate linear program including a stochastic jump constraint term representative of stochastic jumps of the hybrid process; solving the approximate linear program; and controlling the system based on the solved approximate linear program.

DETAILED DESCRIPTION

Figure 1:
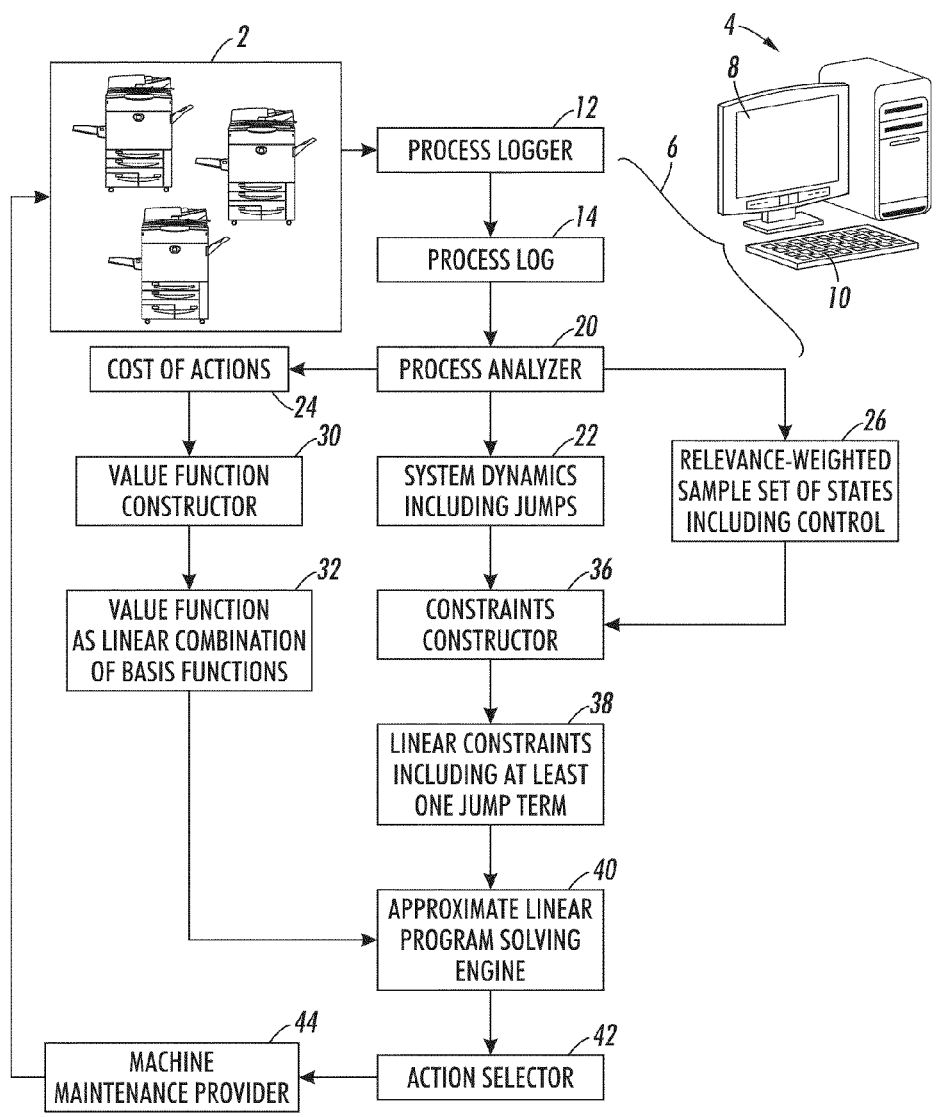
FIG. 1 diagrammatically shows a scheduling or planning system including a user interface.

The disclosed scheduling or planning techniques relate to hybrid processes including stochastic jumps. A hybrid process is generally continuous, but includes an occasional jump, that is, a stochastic jump which is an occasional abrupt transition in the generally continuous hybrid process. Although the hybrid process is generally continuous including stochastic jumps, it is contemplated for the hybrid process to be represented by discrete time samples for the purpose of processing related to the scheduling or planning. In some embodiments, the hybrid process is a semi-Markov process and the stochastic jumps are hazard events of the semi-Markov process. The hybrid process is also a controlled process, in that actions can be taken that affect or change the state of the process.

In some embodiments, the hybrid process represents a service process, such as a machine repair service, a delivery service, a manufacturing service, or so forth, and the stochastic jumps represent service event nucleations, that is, events that initiate, necessitate, or otherwise cause a service event to arise. For example, in a machine repair service, a service event nucleation may correspond to receipt of a report of a machine breakdown, such report being generated and communicated by any suitable approach such as a manual or semi-manual approach (e.g., telephone, filling out an Internet failure report form, or so forth), or an automated approach (e.g., a sensor in the machine detects a fault and the machine automatically reports the automatically sensed fault). Actions in such embodiments may include, for example, assigning a particular repair unit to repair a particular machine. For a delivery service, a service event nucleation may correspond to receipt of a telephone call from a customer requesting delivery of an item. Actions in such embodiments may include, for example, assigning a particular delivery unit to acquire and deliver a particular item to a particular location. For a manufacturing service, a service event nucleation may correspond to receiving an order for parts, and an action may include assigning a particular manufacturing resource to generate the parts. These are merely illustrative examples, and more generally the disclosed scheduling or planning techniques are applicable to any system or process whose operation is suitably represented as a hybrid process including stochastic jumps.

The planning or scheduling identifies optimal control actions for given state. It is to be appreciated that the term "optimal", "optimum", and the like as used herein does not necessarily denote a global or absolute optimal or optimum value, but rather may denote a substantially improved value respective to an initial set of conditions in the case of an iterative optimization, or may denote a value that is locally optimal, or so forth. Similarly, the terms "minimum", "maximum", and the like as used herein may denote substantially minimized or maximized values that are however not necessarily the absolute or global minimum or maximum.

With reference to FIG. 1, an illustrative system comprising a network of marking engines 2 is illustrated as an example. Although the network of marking engines 2 is illustrated in FIG. 1 as including three illustrative printers, it will be appreciated that the network of marking engines 2 may include fewer or greater than three marking engines, such as one, two, three, four, five, ten, fifteen, twenty-five, fifty, or more marking engines. It will further be appreciated that the network of marking engines 2 may include devices other than printers, such as multi-functional devices (MFD's), facsimile machines, copier machines, or so forth. Still further, as already noted the system may be different in kind from the illustrated network of marking engines 10, such as a system (i.e., fleet) of vehicles, a robotic system, or so forth.

The system executes a process that is suitably represented as a hybrid process including stochastic jumps. For the illustrated network of marking engines 2, the hybrid process suitably relates to the process of operating the marking engines of the network of marking engines 2. This hybrid process is generally continuous, i.e. entailing operations that do not change abruptly, e.g. executing print jobs, cycling into and out of standby mode as usage ebbs and flows, reporting routine maintenance conditions such as being low on paper, and so forth. The hybrid process also includes stochastic jumps, such as a stochastic jump representing a machine state transition from an operational state to a failure state, a stochastic jump representing a machine state transition from a failure state to a "being serviced" state, and a stochastic jump representing a machine state transition from the "being serviced" state back to an operational state.

A planning or scheduling system is provided to determine actions to take so as to control the process executed by the system 2. In FIG. 1, the planning or scheduling system is embodied as a computer 4 programmed to perform a planning or scheduling method 6 that is diagrammatically shown in FIG. 1. The illustrated computer 4 includes a display 8 for displaying results such as a proposed action, and one or more user interface devices such as a keyboard 10 by which the user may interact with the planning or scheduling system.

The illustrated system including the computer 4 is an example. In other contemplated embodiments, the planning or scheduling system may be embodied as a remote Internet server executing suitable software, or as a personal data assistant (PDA) or other device including a digital processor configured to execute software or firmware instructions implementing the planning or scheduling. In other embodiments, the planning or scheduling system may be embodied as a storage medium storing instructions executable on such a digital processor to implement the planning or scheduling. The storage medium may comprise, for example, a magnetic disk, an optical disk, a read-only memory (ROM), a random access memory (RAM), a remote Internet server storage medium, or so forth.

A process logger 12 monitors the process executed by the system 10 and generates a process log 14. Although the hybrid process is generally continuous, the process log 14 optionally comprises discrete samples, such as recording information pertaining to the execution of each print job, recording information pertaining to reloading of paper, and so forth. The process log 14 also records occurrences of stochastic jumps, such as machine failures.

The process log 14 is analyzed by a process analyzer 20 to determine system dynamics including jump dynamics 22 and the available types of actions and corresponding costs of actions 24. The process log 14 also optionally includes a simulation component or random sampler that generates a relevance-weighted sample set of states including control (that is, sample actions) 26 for use in the planning or scheduling. The process analyzer 20 can be an automated components, such as a suitably programmed digital processor. Alternatively, the functionality of the process analyzer 20 can be performed by a human analyst who studies the hybrid process using the process log 14 or other available information and generates the system dynamics 22 and action costs 24.

The action costs 24 are used by a value function constructor 30 to generate a value function as a linear combination of basis functions 32. The value function 32 represents action costs respective to the hybrid process including stochastic jumps. The system dynamics 22 are used by a constraints constructor 36 to construct one or more linear constraints including at least one jump constraint 38. The jump constraint is typically a stochastic jump constraint term comprising a combination of a stochastic jump probability and an expected change in the value function 32 caused by a stochastic jump occurrence. For example, the stochastic jump constraint term may comprise a product of (i) a stochastic jump probability and (ii) an expected change in the value function 32 caused by a stochastic jump occurrence.

The combination of the value function 32 and the constraints 38 define an approximate linear program (ALP), but one which is modified compared with a conventional approximate linear program in various ways, such as in that it includes a jump constraint. An approximate linear program (ALP) solving engine 40 receives the ALP 32, 38 and solves the ALP 32, 38. The solution entails maximizing the value function 32 or another expression related to the value function subject to the constraints 38, and can employ known techniques for ALP solving. The output of the ALP solving engine 40 includes optimized parameters, that is, coefficients or weights, for the linear combination defining the value function 32. An action selector 42 uses these optimized parameters to select one or more actions for controlling the system 2. A suitable actions implementation tool or system or component, such as an illustrated machine maintenance provider 44, implements the selected action by (in this example) performing marking engine maintenance or repair in accordance with the action selected by the action selector 42.

Having described the principal components of the planning or scheduling system depicted in FIG. 1, some additional aspects of the ALP construction and solving components 30, 36, 40 are described. The value function 32 is suitably represented as $V^w(x) = \Sigma_i w_i f_i(x)$ where w denotes a vector of weights or coefficients and $f_i(x)$ are the basis functions. This amounts to transforming the value function from a high dimensional space corresponding to all possible states to a substantially lower dimensional space corresponding to the space of the weights w. The general formulation of an ALP is as follows:

$$\text{maximize: } \sum_i w_i \alpha_i \quad (1)$$

$$\text{subject to (s.t.): } \sum_i w_i (f_i(x) - g_i(x)) - R(x, a) \leq 0 \ \forall \ x \in X, \quad (2)$$

$$a \in A$$

where X represents all possible states, x represents a state vector, A represents the set of possible control actions, a represents a control action, $\alpha_i = \int \psi(x) f_i(x) dx$ where $\psi(x)$ represents the state relevance density, that is, the probability of visiting state x, and where:

$$g_i(x, a) = \int \int \gamma^t \Pr(t|a) \Pr(x'|x, a, t) f_i(x') dx' dt \quad (3)$$

and $$R(x, a) = \int \int C(x') \gamma^t \Pr(t|a) \Pr(x'|x, a, t) dx' dt \quad (4)$$

The function C(x') represents the cost 24 of transitioning from state x to state x' while the parameter $\gamma^t$ represents a time-based discount factor. This illustrative formulation maximizes the cost-to-go function for a problem of minimization of cost.

The hybrid process includes continuous portions suitably represented by the state vector x, occasionally interrupted by stochastic jumps that cause an abrupt change in the state vector x. In the following illustrative examples, the continuous portions are represented by a controlled Brownian motion, that is, an infinitesimal random walk, denoted $W(t) \in \Re$. The stochastic jumps are represented by a term $dq(t) \in \{0, 1\}$. For such a Brownian motion, the following condition holds: $E[dW] = 0$, $E[dW^2] = dt$. The hybrid process therefore corresponds to a stochastic differential equation of the form:

$$dx = \mu(x, u, t)dt + \sigma(x, u, t)dW + J(x, u, t)dq \quad (5)$$

where $\mu$ is the mean drift, $\sigma$ is the local variance parameter, and J is the jump random size variable. The objective is to select the control action to minimize the cost discounted with a parameter $\rho > 0$ according to:

$$E\left[\int_0^\infty e^{-\rho s} C(x, u, s) ds\right]. \quad (6)$$

The optimal control satisfies the stochastic Hamilton-Jacobi-Bellman equation:

$$\min_u \left[ E[C \mid t, x, u] + \frac{\partial V}{\partial x}\mu + \frac{1}{2}\frac{\partial^2 V}{\partial x^2}\sigma^2 + \right. \quad (7)$$

$$\left. (E_J[V(t, x+J) \mid t, x, u] - V)\Omega \right] + \frac{\partial V}{\partial t} = \rho V$$

where $\Omega(x,u,t)dt$ is a jump probability (for example, a hazard function in the case of a semi-Markov process), that is, $\Omega(x, u, t)dt$ is the probability that dq=1 on [t,t+dt] given t, x, u.

To turn the foregoing into an approximate linear program (ALP), the weighted combination of basis functions $f_i(t,x)$ is substituted for the value function V and turned into an inequality. Coupled with a maximization of the integral weighted by the state relevance density $\psi(x)$, the ALP can be written as:

$$\text{maximize } \sum_i w_i \alpha_i \text{ with respect to the weights vector } w \quad (8)$$

$$\text{subject } E[C \mid t, x, u] + \sum_i w_i G_i(t, x, u) \geq 0 \text{ for all } x, u \quad (9)$$

where $$G_i = \frac{\partial f_i}{\partial x}\mu + \frac{1}{2}\frac{\partial^2 f_i}{\partial x^2}\sigma^2 + (E_J[f_i(t, x+J) \mid t, x, u] - f_i)\Omega + \frac{\partial f_i}{\partial t} - \rho f_i \quad (10)$$

and $$\alpha_i = \int dx \psi(x) f_i(x). \quad (11)$$

In typical examples the parameters u, $\sigma$, $\Omega$ vanish for certain x, u and therefore the corresponding basis derivatives do not appear. The ALP of Equations (8)-(11) incorporate stochastic jumps of the hybrid process through the jump size random variable J and the jump probability $\Omega$.

The ALP of Equations (8)-(11) is in a standard approximate linear programming format, and accordingly is solved by the ALP solving engine 40 using any suitable ALP solution process of the type known for solving ALP directed to purely continuous processes without stochastic jumps. The solution of the ALP of Equations (8)-(11) yields optimized values for the weights $w_i$.

The action selector 42 then selects control action based on the optimized values for the weights $w_i$. This can be done, for example, by minimizing the Q function using the known approach of Q learning. For the solved ALP of Equations (8)-(11), the Q function is suitably written as:

$$Q(t, x, u) = E[C \mid t, x, u] + \sum_i w_i G_i(t, x, u). \quad (12)$$

However, the ALP of Equations (8)-(11) specifies for all x, u and hence has an infinite number of constraints. A suitable solution is to sample states x according to the state relevance density $\psi(x)$, for example using the relevance weighted sample set of states 26. This approach is known as randomized constraint sampling, and may be iterated. An initial estimate is obtained for the state relevance density $\psi(x)$ based on the process analysis performed by the process analyzer 20, and then the ALP is solved using the initial estimate for $\psi(x)$. An updated state relevance density $\psi(x)$ can then be computed through Monte Carlo by applying the Q policy (greedy) and doing a probability density estimate. For each state x it is desired to impose the best u as the constraint. In some applications, it may be desired to use hybrid systems in which the dynamics changes, or it may be desired to use different basis functions in different regions to model discontinuities in V(x) or its derivatives. In such applications, additional constraints can be included in the ALP to accommodate these conditions. For example, consider a system moving from a phase where the value function is given by a basis approximation A to a phase where the value function is approximated as B at some (t,x). Considering the Bellman equation over this infinitesimal (but controlled) transition, it is recognized that a suitable additional transition constraint is that the value before is less than or equal to the value after, that is, $A(t^-,x^-)=B(t^+,x^+)$.

An illustrative weighted scheduling application is considered here. The system has a state x, X. A machine is denoted by index k. If $X_k=0$, then component $x_k$ represents the time since the last service of the machine k. If $X_k=1$ then $x_k$ represents the time since machine failure. If $X_k=2$ then $x_k$ represents the time since service started. The component $X_k$ is considered as a number modulo 3, that is, $X_k$ cycles between values 0, 1, 2, 0, 1, 2, ... as the machine k goes from in-service to a failure mode to a "being serviced" mode back to the in-service mode. The machines of the system are assumed to behave independently, with cumulative density of failing or service completion at time $x_k$, being given by $F_k(X_k,x_k)$. The dynamics of the system can be written as the stochastic differential equations $dx_k=dt-x_k dq_k$ and $X_k=X_k \oplus dq_k$ where q is governed by F and the operator "$\oplus$" denotes addition modulo 3. In any given phase, the value function is given by the stochastic Hamiltonian-Jacobi-Bellman (HJB) equation:

$$\rho V(x, X) = \min_u \left\{ R(x, X) + \sum_k \frac{\partial V}{\partial x_k} + p_k(V(0_k x, X \oplus 1_k) - V(x, X)) \right\} \quad (13)$$

which corresponds to Equation (7) for this hybrid process. In Equation (13), $0_k$ sets the k component to zero and $1_k$ is the vector of zeros with 1 at component k. The symbol $\rho$ is the discount parameter which is $-\log(\gamma)$ for the $\gamma$ factor in the discrete formulation. For brevity the arguments for the hazard function $p_k$ have been omitted. These arguments can be written in full as:

$$p_k(x_k, X_k) = \frac{\partial F_k(X_k, x_k)}{\partial x_k} \frac{1}{1 - F_k(X_k, x_k)}. \quad (14)$$

This stochastic HJB expression is substantially simpler than a discrete time formulation which (i) requires sums of products for the components $p_k$, (ii) requires an expectation operator to estimate the cost term R, and (iii) introduces discretization errors.

To provide a more quantitative example, a simplified two-dimensional version of this hybrid process is considered, in which the state space is divided into three parts corresponding to $(X_1,X_2)=(0,0),(2,0),(0,2)$. Let A, B, C denote the value function on each part. A normalizing coordinate transform mapping individual times in the range $k[0,\infty]$ to corresponding x, y values lying in the range [0,1] is suitably performed. This is based on the solution to the corresponding one-dimensional problem resulting in an ordinary differential equation (ODE) form for the stochastic HJB equation. In general, solutions to one-dimensional problems of this nature can be written in terms of integrals of the form:

$$\int_t^\infty dt' \frac{1 - F(X, t)}{1 - F(X, t')} \exp(\rho(t - t')). \quad (15)$$

This can be demonstrated via Green's functions. Typically, the corresponding Green's function for the (n>2)-dimensional case result in integrals that cannot be done in closed form and which depend on n varying state components. While there are special cases, such as when $p_k$ is a constant, corresponding to the exponential distribution, in the present example a more general approach is desired. Accordingly, a Weibull density is selected for F, which is given by:

$$F(t) = 1 - e^{-\left(\frac{t}{\lambda}\right)^k}. \quad (16)$$

For this choice of F after solving the corresponding ODE it is found that the value function is given by:

$$V(0, t) = V(0, \infty) - \rho V(0, \infty)\phi(t, \lambda_W, k_W, \rho) \quad (17)$$

and $$V(2, t) = V(2, \infty) + (R - \rho V(2, \infty))\phi(t, \lambda_S, k_S, \rho) \quad (18)$$

where $$\phi(t, \lambda, k, \rho) = \int_t^\infty dt' \exp\left(\left(\frac{t}{\lambda}\right)^k - \left(\frac{t'}{\lambda}\right)^k + \rho(t - t')\right) \quad (19)$$

By setting $x(t_1)=\mu\phi(t_1,\lambda_{W1},k_{W1},\rho)$ and $\mu=1/\phi(0,\lambda_{W1},k_{W1},\rho)$ for the $X_1=0$ and a corresponding choice for $X_1=2$ and for y, this will lead to the desired mapping to [0,1] intervals. In these terms it follows:

$$Y_1(0, x) = \frac{\partial x}{\partial t_1} = (\Omega_1(0, x) + \rho)x - \mu, \quad (20)$$

$$\Omega_1(0, x) = p_1(0, x^{-1}(x)) = k_{W1}\left(\frac{x^{-1}(x)}{\lambda_{W1}}\right)^{k_{W1}-1}.$$

There is not a closed-form expression for $\Omega$. A suitable rational function approximation can be made for $\Omega$, for example using Vector Fitting, having done the appropriate integrals numerically. The stochastic HJB constraints are then given by:

$$
\begin{aligned}
&Y_1^{0x}A_x + Y_2^{0y}A_y &&+ \Omega_1^{0x}(A^{0y} - A) + \Omega_2^{0y}(A^{0x} - A) &&- \rho A &&\geq 0 x, y \in (0, 1] &&(21)\\
&Y_1^{2x}B_x + Y_2^{0y}B_y &&+ \Omega_1^{2x}(B^{0y} - B) + \Omega_2^{0y}(B^{x0} - B) &&- \rho B + R_1 &&\geq 0 x, y \in (0, 1]\\
&Y_1^{0x}C_x + Y_2^{2y}C_y &&+ \Omega_1^{0x}(C^{0y} - C) + \Omega_2^{2y}(C^{x0} - C) &&- \rho C + R_2 &&\geq 0 x, y \in (0, 1]\\
&Y_1^{0x}A_x^{x0} &&+ \Omega_1^{0x}(A^{00} - A^{x0}) &&- \rho A^{x0} + R_2 &&\geq 0 x \in (0, 1]\\
&Y_1^{2x}B_x^{x0} &&+ \Omega_2^{0y}(A^{00} - A^{0y}) &&- \rho A^{0y} + R_1 &&\geq 0 y \in (0, 1]\\
&Y_2^{2x}C_y^{0y} &&+ \Omega_1^{2x}(B^{00} - B^{x0}) &&- \rho B^{x0} + R_1 + R_2 &&\geq 0 x \in (0, 1]\\
& &&+ \Omega_2^{2y}(C^{00} - C^{0y}) &&- \rho C^{0y} + R_1 + R_2 &&\geq 0 y \in (0, 1]\\
& && A^{1y} - B^{0y} && &&\geq 0 y \in (0, 1]\\
& && A^{x1} - C^{x0} && &&\geq 0 x \in (0, 1]\\
& && B^{1y} - A^{0y} && &&\geq 0 y \in (0, 1]\\
& && C^{x1} - A^{x0} && &&\geq 0 x \in (0, 1]
\end{aligned}
$$

where subscripts are used for derivatives and superscripts are used for points of evaluation. For instance, $$A_x^{x0} = \frac{\partial A}{\partial x}(x, 0).$$

For writing the value function as a linear combination of basis functions, a cubic basis is employed for each part. The basis functions are the set of functions $\{1, x, y, x^2, xy, y^2, x^3, x^2 y, xy^2, y^3\}$. Accordingly, there are $3 \times 10 = 30$ coefficients that are labeled herein as $a_1, \ldots, a_{10}, b_1, \ldots, b_{10}, c_1, \ldots, c_{10}$. The state relevance distribution is assumed to be a distribution in which the coefficient of all basis functions is $1/d$ where d is the order of the basis term. For instance $d=3$ for the basis function $xy^2$. This state relevance distribution produced good results for this example; however, in other applications a probability density function is advantageously used for the state relevance distribution.

The standard linear programming solving engine LP Solve was used to compute the linear program for a variety of service distributions.

Figure 2:
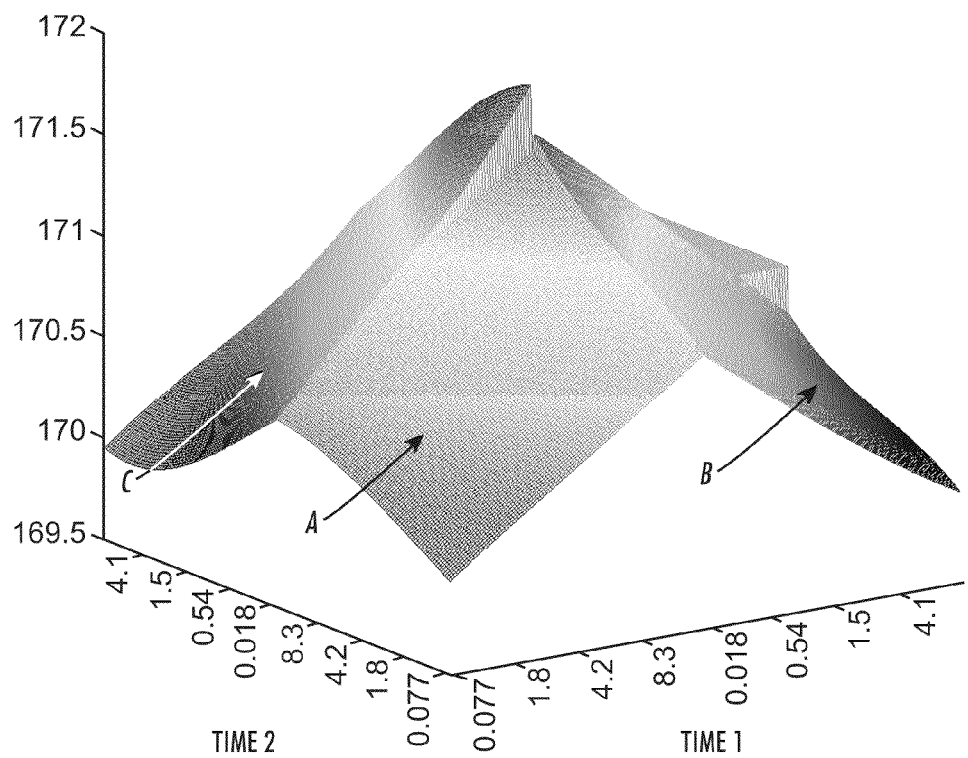
FIG. 2 plots the value function of FIG. 1 in the case of an illustrative weighted scheduling application.

With reference to FIG. 2, a plot of an example of the resulting value function is shown. In FIG. 2, it is seen that the axes are doubled-up. In other words, each axis represents two time parameters. The first portion of each axis denotes the working phase for that device. The first point at infinity corresponds to pre-service. The next section on an axis denotes the service phase for that device. This is followed by a point at infinity corresponding to service completion. Note that the value increases as either time increases in region A. This intuitively corresponds to an increased hazard of failure. At the peak, where both machines are nearly broken, there is a clear discontinuity. Indeed on the intersection between regions A and C, the value on C is much higher. This corresponds to a preference to wait for device 1 to fail, rather than immediately servicing device 2 even though it has already failed. While in a complete solution, the value function should be continuous everywhere except near such a peak, this mixture of continuity and discontinuity is not possible with polynomials: when they start off equal in value and all derivatives, then they remain equal. This is because they are analytic functions. Nevertheless the borders between the regions provide a satisfactory approximation of continuity.

Processing by network servers is considered as another illustrative example. This application is useful, for example, in lean document production and in call centers. The illustrative example includes two servers denoted S1, S2 that process a sequence of jobs. The jobs have a heavy tailed characteristic, rather than having exponential service time. Therefore the time for which a job has been in service is a parameter in the state. Thus the state is of the form $n_1, \ldots, n_4$ which is the number of jobs waiting at each part of the system, and $t_1$, $t_2$ denotes the time for which a job has been in service by server S1 and server S2. The system dynamics can be written in terms of the controls $u_1$, $u_2$ which have value 0 when the corresponding server is idle, have value 1 when the server is processing a job from the outside ($n_1$, $n_3$) and have value 2 when the server is processing a job from the inside ($n_2$, $n_4$). The dynamics are given by:

$$
\begin{aligned}
dn_1 &= dq_1 - u_1 \to 1\\
dn_2 &= dq_2 - u_2 \to 2\\
dn_3 &= dq_3 - u_2 \to 1\\
dn_4 &= dq_4 - u_1 \to 2\\
dt_1 &= dt - t_1(dq_2 + dq_6)\\
dt_2 &= dt - t_2(dq_3 + dq_5) &&(22)
\end{aligned}
$$

where "$\to$" is the indicator that the control changes to the corresponding value and $q_k \in \{0, 1\}$ is a jump process. These jump processes have hazard functions $\Omega_k(t_1, t_2, u_1, u_2)$ given by:

$$
\begin{aligned}
\Omega_1 &= \lambda_1\\
\Omega_2 &= \omega_2(t_1) \delta_{u_1 1}\\
\Omega_3 &= \lambda_3\\
\Omega_4 &= \omega_4(t_2) \delta_{u_2 1}\\
\Omega_5 &= \omega_5(t_2) \delta_{u_2 2}\\
\Omega_6 &= \omega_6(t_1) \delta_{u_1 2} &&(23)
\end{aligned}
$$

where $\delta$ is a Kronecker delta and $\lambda_k$ is an arrival rate. This entails an assumption that the external arrivals are exponentially distributed. It is further assumed in this illustrative example that the $\omega_k$ values are the hazard function of a heavy-tailed distribution. A natural choice of a heavy-tailed distribution is that of a totally skewed stable density. The general one-dimensional stable density with variates X has characteristic function:

$$E_X[\exp(jzX)] = \varphi(z) = \exp\{j\mu z - \gamma|z|^\alpha [1 + j\beta\text{sign}(z)\omega(z, \alpha)]\} \quad (24)$$

where $$\omega(z, \alpha) = \begin{cases} \tan\frac{\alpha\pi}{2} & \text{if } \alpha \neq 1 \\ \frac{2}{\pi}\log|z| & \text{if } \alpha = 1 \end{cases} \quad (25)$$

and $-\infty<\mu<\infty$, $\gamma>0$, $0<\alpha\leq 2$, and $-1\leq\beta\leq 1$. The totally positively skewed variety, which is natural for a waiting time, has $\beta=1$. It is also reasonable to assume that $\alpha\in(1,2)$. If $\alpha<1$ then the distribution does not have a mean while if $\alpha=2$ it is a Gaussian and cannot be positively skewed. It is noted that it is possible to compute the probability density or cumulative density as the imaginary part of a Meijer G function, by numerical inversion of this Fourier transform or by spline approximations. As with the previous illustrative example, a coordinate transform is performed, of the form $x_k(t_k;u_k)=\mu_k(u_k)\phi_k(t_k;u_k)$ where:

$$\phi_k(t_k, u_k) = \int_{t_k}^{\infty} dt' \frac{1-F(t_k; u_k)}{1-F(t'; u_k)} \exp(\rho(t_k - t')). \quad (26)$$

Furthermore, this transform is applied to obtain a transformed $\Omega$ and a function $$Y(x) = \frac{\partial x}{\partial t}.$$

These are fitted as rational functions.

The basis for this illustrative example is the set of all polynomials up to and including degree 3 in $x_1, x_2, n_1, n_2, n_3, n_4$ repeated 9 times to represent the possible combinations of control actions. In this illustrative example the constraints corresponding the stochastic HJB equation correspond to:

$$\left\{ \sum_{k=1,\ldots,4} n_k + \sum_{i=1,\ldots,2} \frac{\partial V}{\partial x_k} + \sum_{s=1,6} \Omega_s(x_1, x_2, u_1, u_2)(T_s V - V) - \rho V \ldots \right\} \geq 0 \quad (27)$$

for all x, u. Here $T_s$ is an operator that increments and decrements the appropriate n components of the state and sets the appropriate t to zero. State relevance densities are computed as:

$$\psi = C Pr(t_1 = x_1^{-1}(x_1)|u_1) Pr(t_1 = x_1^{-1}(x_1)|u_1) \exp(-\rho(n_1 + n_2 + n_3 + n_4)) \quad (28)$$

For a normalization constant C. Since this is a product of one-dimensional probability density functions (PDF's), corresponding integrals over the basis functions are relatively simple numerically.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A scheduling or planning process comprising:
   constructing an approximate linear program including (i) a value function defined by a linear combination of basis functions, the value function representing action costs respective to a hybrid process including stochastic jumps and (ii) a linear constraint including a stochastic jump constraint term representative of stochastic jumps in the hybrid process;
   solving the approximate linear program; and
   selecting an action to be performed based on parameters provided by the solved approximate linear program;
   wherein the constructing, solving, and selecting operations are performed by a digital processor.

2. The scheduling or planning process as set forth in claim 1, wherein the constructing comprises:
   associating cost functions with actions of a set of actions, each cost function being indicative of an expected cost for the hybrid process of performing a corresponding action selected from the set of actions; and
   combining the cost functions to construct the value function.

3. The scheduling or planning process as set forth in claim 2, wherein the value function is indicative of an expected total cost for the hybrid process between a current time and a horizon time of performing an action at the current time.

4. The scheduling or planning process as set forth in claim 1, further comprising:
   performing the selected action to be performed.

5. The scheduling or planning process as set forth in claim 1, wherein the constructing comprises:
   sampling the hybrid process according to a state relevance density; and
   constructing the linear constraint based on the sampling.

6. The scheduling or planning process as set forth in claim 1, wherein the constructing comprises:
   constructing the stochastic jump constraint term as a combination of a stochastic jump probability and an expected change in the value function caused by a stochastic jump occurrence.

7. The scheduling or planning process as set forth in claim 6, wherein the linear constraint comprises an inequality corresponding to a stochastic Hamilton-Jacobi-Bellman (HJB) equation and incorporating the stochastic jump constraint term.

8. The scheduling or planning process as set forth in claim 1, wherein the constructing comprises:
   constructing the stochastic jump constraint term as a product of (i) a stochastic jump probability and (ii) an expected change in the value function caused by a stochastic jump occurrence.

9. The scheduling or planning process as set forth in claim 1, wherein the hybrid process is a function of time, and the constructing comprises:
   transforming the time variable of the hybrid process to generate a transformed hybrid process that is a function of a transformed variable that is in turn a function of time, the transforming employing a non-linear transformation.

10. The scheduling or planning process as set forth in claim 9, wherein the transforming comprises:
  transforming to a transformed polynomial hybrid process, the transforming including a transformation of the basis functions of the value function.

11. The scheduling or planning process as set forth in claim 1, wherein the hybrid process is a semi-Markov process and the stochastic jumps are hazard events of the semi-Markov process.

12. The scheduling or planning process as set forth in claim 1, wherein the linear constraint comprises an inequality corresponding to a stochastic Hamilton-Jacobi-Bellman (HJB) equation.

13. A non-transitory digital storage medium storing instructions executable to perform a scheduling or planning process comprising:
  constructing an approximate linear program including (i) a value function defined by a linear combination of basis functions, the value function representing action costs respective to a hybrid process including stochastic jumps and (ii) a linear constraint including a stochastic jump constraint term representative of stochastic jumps in the hybrid process;
  solving the approximate linear program; and
  selecting an action to be performed based on parameters provided by the solved approximate linear program.

14. The non-transitory digital storage medium as set forth in claim 13, wherein the constructing comprises:
  constructing the stochastic jump constraint term as a combination of a stochastic jump probability and an expected change in the value function caused by a stochastic jump occurrence.

15. The non-transitory digital storage medium as set forth in claim 14, wherein the hybrid process is a semi-Markov process and the stochastic jumps are hazard events of the semi-Markov process.

16. The non-transitory digital storage medium as set forth in claim 13, wherein the constructing comprises:
  constructing the stochastic jump constraint term as a product of (i) a stochastic jump probability and (ii) an expected change in the value function caused by a stochastic jump occurrence.

17. The non-transitory digital storage medium as set forth in claim 16, wherein the linear constraint comprises an inequality corresponding to a stochastic Hamilton-Jacobi-Bellman (HJB) equation and incorporating the stochastic jump constraint term.

18. A scheduler or planner comprising:
  a value function constructor configured to construct a value function defined by a linear combination of basis functions, the value function representing action costs respective to a hybrid process including stochastic jumps;
  a constraints constructor configured to construct a linear constraint including a stochastic jump constraint term representative of stochastic jumps in the hybrid process;
  an approximate linear program solving engine configured to solve an approximate linear program defined by the value function and the linear constraint; and
  an action selector configured to select an action to be performed based on parameters of the solved approximate linear program;
  wherein the value function constructor, constraints constructor, approximate linear program solving engine, and action selector comprise a digital processor.

19. The scheduler or planner as set forth in claim 18, further comprising:
  a process analyzer configured to acquire or generate a state relevance-weighted sample set of states including sampled actions, the constraints constructor constructing the linear constraint based on the state relevance-weighted sample set of states.

20. The scheduler or planner as set forth in claim 18, wherein the hybrid process is a machine operation process and the stochastic jumps include at least a stochastic jump representing a machine state transition from an operational state to a failure state.

21. The scheduler or planner as set forth in claim 18, wherein the constraints constructor constructs the stochastic jump constraint term as a combination of a stochastic jump probability and an expected change in the value function caused by a stochastic jump occurrence.

22. The scheduler or planner as set forth in claim 21, wherein the linear constraint comprises an inequality corresponding to a stochastic Hamilton-Jacobi-Bellman (HJB) equation and incorporating the stochastic jump constraint term.

* * * * *